United States Patent [19]
Nichols et al.

[11] Patent Number: 5,514,726
[45] Date of Patent: May 7, 1996

[54] POLYMER FOAMS WITH INHERENT NONFLAMMABILITY AND THERMAL STABILITY AND METHODS OF PREPARATION THEREOF

[76] Inventors: Gus Nichols, 2501 Gulf-Freeway, #5, Dickinson, Tex. 77539; C. D. Armeniades, 2127 Addison Rd., Houston, Tex. 77030

[21] Appl. No.: 945,277

[22] Filed: Sep. 15, 1992

[51] Int. Cl.$^6$ .................. C08G 77/00; C08G 77/56; C08G 79/00; C08G 79/08
[52] U.S. Cl. .................. 521/152; 521/153; 521/154; 521/157; 521/178; 521/179; 521/182; 521/184; 521/187; 521/189; 521/902; 521/907
[58] Field of Search ........................ 521/178, 179, 521/182, 184, 187, 152–154, 157, 189, 902, 907

[56] References Cited

U.S. PATENT DOCUMENTS

| | | | |
|---|---|---|---|
| 3,489,696 | 1/1970 | Miller | 521/157 |
| 4,540,717 | 9/1985 | Mahnke | 521/187 |
| 4,694,025 | 9/1987 | Park | 521/88 |

OTHER PUBLICATIONS

Malcolm P. Stevens, "Polymer Chemistry, An Introduction," pp. 122–125 (1990).
John Wiley & Sons, "Fibers, Optical To Hydrogenation," *Encyclopedia of Polymer Science and Engineering*, vol. 7, pp. 154–179.
Polyurethanes, Part I; J. H. Saunders and K. C. Frisch; 1962 p. 97.
Polyurethanes, Part II; J. H. Saunders and K. C. Frisch; 1964, p. 224.

*Primary Examiner*—Rachel Johnson
*Attorney, Agent, or Firm*—Pravel, Hewitt, Kimball & Krieger

[57] ABSTRACT

Polymeric foams with novel chemical compositions are prepared by the condensation of specially-synthesized precursors, which contain (in addition to carbon and hydrogen) one or more of the following elements: oxygen, fluorine, nitrogen (in structures with stable chemical bonds), silicon, boron, phosphorus (in high oxidation states), and certain metals (and/or their oxides and hydroxides). Upon mixing in the proper proportions and/or heating these precursors react rapidly to generate polymeric networks, consisting of heterocyclic crosslink centers, connected with heterochain segments; hydrogen is largely eliminated or replaced by fluorine. These structures possess inherent nonflammability and high thermoxidative stability. Foaming is effected by the gaseous by-products of the condensation reactions, as well as by the addition of foaming agents. The resulting foam products can be formulated to have a wide range of densities and flexibilities.

8 Claims, No Drawings

POLYMER FOAMS WITH INHERENT NONFLAMMABILITY AND THERMAL STABILITY AND METHODS OF PREPARATION THEREOF

FIELD OF THE INVENTION

This invention relates to polymer foams and their preparation. Specifically, it comprises chemical compositions (hereinafter referred to as "foam precursors") which, upon mixing in the proper proportions and/or heating, react rapidly to generate gaseous by-products and novel polymeric networks in the form of rigid or flexible foams with inherent nonflammability and thermal stability. The invention also describes methods for synthesizing the respective foam precursors, and processing these materials so as to generate in situ nonflammable and thermally stable foams with a wide range of physical properties.

BACKGROUND OF THE INVENTION

Polymeric foams of many different chemical compositions have found widespread industrial and household applications. In particular, open-cell foams based primarily on polyurethane chemistry, can be formulated to show outstanding resiliency and cushioning properties. Polyurethane foams can be produced rapidly and inexpensively in a variety of sizes and complex shapes. Consequently, for cushions, mattresses, and pads, polyurethane foams currently dominate the upholstery and bedding industry, replacing the older, more expensive, and heavier foamed rubber (latex foam). Seats in automobiles, buses, and aircraft are now made almost exclusively from polyurethane foam. The development of foam-in-place techniques has extended the use of polyurethane foams as impact-absorbing materials in packaging and shipping containers. Foam-in-place techniques achieve rapid, in situ generation of polyurethane foam by mixing two liquid components, which react rapidly and exothermally to produce a polymer network in a variety of shapes, suitable for packaging. Foaming is produced by the flashing of low-boiling additives (foaming agents) and/or by the generation of carbon dioxide when water is present in the reaction system. In the packaging of fragile items, such as electronic equipment ranging from small components to televisions and computers, foamed-in-place polyurethanes are rapidly becoming the materials of choice. Other uses of polyurethane foams include thermal insulation and flotation (closed-cell foams).

In addition to polyurethane, foams based on polystyrene (styrofoam), polyethylene, plasticized polyvinyl chloride, and other polymers are used extensively in industrial and household applications. However, such prior-art polymer foams, especially those based on polyurethanes, have a very serious drawback: they are highly flammable. When exposed to flame they ignite easily and burn rapidly with the evolution of copious black smoke, highly toxic gases, and flaming liquids. Consequently the use of these materials has repeatedly caused (or contributed to) serious injury and loss of life in building, automobile, aircraft, and spacecraft cabin fires. Another limitation of prior art polymer foams is their low thermal stability: these materials, even in the absence of flame, decompose at temperatures above 200° C., often producing toxic and/or flammable byproducts.

Extensive efforts to reduce the flammability of current polymer foams have met with limited success. The incorporation of known fire retardants as additives to the foam formulations or as chemically-bonded abducts to the polymer networks has invariably entailed deterioration of various desirable foam properties (increase in foam density, decrease in flexibility and/or strength) with only modest reduction in flammability.

The flammability of foams may be measured and compared in terms of a Limiting Oxygen Index (LOI). Limiting Oxygen Index (LOI) is a measure of the minimum concentration of oxygen (in a controlled oxygen-nitrogen atmosphere) that is necessary to support a flame in the test material for at least 3 minutes under specified test conditions (ASTM D2863 Test Standard). In general, since air contains 21% oxygen, materials with LOI values of or below 21% are considered highly flammable; to be considered "fire-retardant" a material must have LOI values in excess of 27.

Most "fire-retardant" polyurethane formulations show an increase of only 8–10 points in their Limiting Oxygen Index (LOI) values; 27–32 for fire-retardant polyurethanes compared to 16–22 for the basic systems. This lack of success in formulating nonflammable polyurethane foams is due to the low thermal stability of the polyurethane structures, which decompose at temperatures of about 200° C., producing flammable liquids and toxic gases. Incorporation into the polyurethane molecular chains of thermally stable and/or fire retardant structures, such as isocyanurate rings, aromatic diols, and phosphorus, has also shown limited success in enhancing nonflammability (due to thermal decomposition of the urethane linkages) while considerably reducing the flexibility of the modified polyurethane foams. Other prior art foams, such as those based on polyvinyl chloride, while inherently nonflammable due to the presence of halogen, readily decompose upon heating with the release of the highly toxic and corrosive hydrogen chloride gas; consequently they are quite hazardous in fire situations.

The only current commercial foams that are inherently nonflammable are polyimide foams. These are formed by the expansion of poly(benzophenonetetracarboxylic imide) networks by dielectric heating, usually in microwave ovens. Foaming results from the evolution of water and/or other volatile by-products in the reaction. Foams with varying degrees of flexibility can be produced by varying the polyimide backbone structure. These foams have outstanding thermal stability and inherent nonflammability. They are nonigniting in air, showing LOI values of 39–43. In contact with an open flame these foams shrink and char with little smoke or toxic gas emission. Polyimide foams are marketed by the Imi-Tech Corporation under the trade name of "Solimide"®.

However, the current polyimide foams have several drawbacks. The cushioning properties of polymide foams are not as good as those of polyurethanes, in the sense that polyimide cushions are much less comfortable to sit or lie on; consequently, in applications where fire retardant foams are required (such as aircraft seats) polyimide foams are used as envelopes, enclosing polyurethane foam cores. Polymide foams cannot easily be foamed in place: they are available only in the form of block or slab stock, which, for packaging applications, must be individually cut and shaped, a very laborious and wasteful process. Although a method for in situ production of polyimide foams at ambient temperatures by the addition of up to 50% furfuryl ether to the system has been described in U.S. Pat. No. 4,184,201 (issued Jan. 15, 1980) this process is very difficult to control, and the use of the highly flammable furfuryl ether significantly reduces the flame retardency of the resulting foam. Consequently, this foam-in-place process has found little commercial application for production of a polyimide foam. Current methods of polyimide synthesis require expensive raw materials, and the foam production processes are slow and energy-consuming. Consequently polyimide foams sell for prices (currently about $80– 90/kg) which are 20–30 times higher than the prices of most polyurethane foams.

It would be highly desirable to have new foam systems which would possess the advantages of polyurethane foams (low cost, easy to foam in place, good flexibility and resilience) as well as the nonflammability and thermal stability of the polyimide foams.

SUMMARY OF THE INVENTION

The present invention comprises chemical compositions and methods of synthesis and processing thereof, which produce novel foam systems that combine the advantages of low cost and ease of foaming-in-place (which are characteristics of polyurethane foams) with inherent nonflammability and thermal stability equal to or greater than polyimide foams.

Nonflammability in the products of this invention is achieved by synthesizing chemical structures, which are deficient in the two most easily oxidizable (highly combustible) elements: hydrogen (H) and carbon (C). Hydrogen is largely eliminated or replaced by a noncombustible monovalent element, such as fluorine (F); while carbon is partially replaced by: elements that cannot (themselves) oxidize, such as oxygen (O); elements that do not support combustion such as nitrogen (N); oxidizable elements such as phosphorus, boron and silicon, incorporated in the polymer chain at a high oxidation state, $P^{+5}$ (or $P^{+4}$), $B^{+3}$, $Si^{+4}$. Certain metals and/or metallic compounds (oxides, hydrated oxides, carbonates) with fire retardant properties may also be incorporated into the chemical structure to further increase nonflammability.

Thermal stability in the products of this invention is enhanced by incorporating the carbon-replacing elemental components in stable chemical bond configurations; for example, nitrogen is used in the form of heterocyclic structures, such as triazines, guanamines, cyanurates, and/or isocyanurates; phosphorus is incorporated in the form of

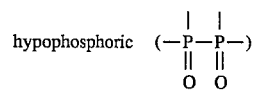
hypophosphoric

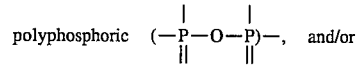
polyphosphoric    and/or

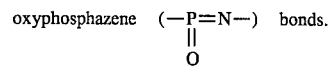
oxyphosphazene    bonds.

Typically, substances with stable chemical structures have high melting points and lack solubility; hence they are difficult to process (intractable). The inability of polyimides to be foamed in place is an example of the intractability of thermally stable structures. The present invention avoids the problem of intractability by planning the sequence of synthesis reactions so as to ensure that the foam precursors not only possess the desirable non-carbon elements in stable structures but are also tractable (liquids or low melting solids) by reason of containing certain carbon- and hydrogen-bearing functional groups, which are highly reactive. When these foam precursors are mixed and/or heated to temperatures ranging from ambient to about 150° C. their reactive functional groups condense with each other to generate polymer networks that contain only nonflammable and thermally stable structures, while the reactive moieties present in the precursors are expelled from the system as volatile by-products of the condensation reactions. This planned reaction sequence has an important additional advantage. The volatile by-products of the final polycondensation reactions serve as foaming agents, expanding the nascent polymer network to many times its original volume. These polycondensation/foaming reactions are quite rapid and can be formulated to generate stable foams within time periods ranging from a few seconds to a few minutes from the mixing of the foam precursors. The foams so formed may be formulated to be rigid or flexible, open or closed-cell foams as a function of the functionality and stoichiometry of the precursors selected for foam productions and the sequence of mixing and reaction conditions selected for foam production.

The foam precursors of the present invention have chemical structures, chosen from the following types of compounds:

(A) polyfunctional, nitrogen-containing, heterocyclic compounds of the formula:

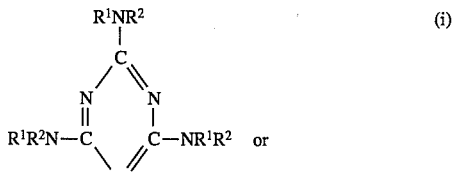 (i)

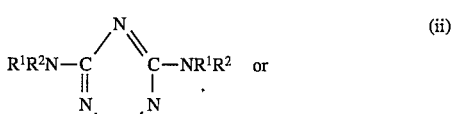 (ii)

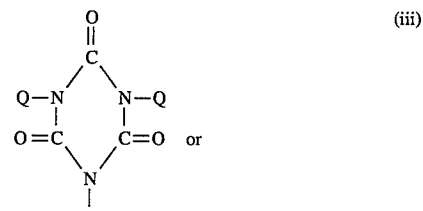 (iii)

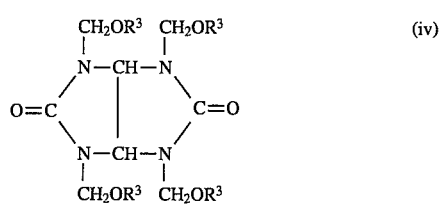 (iv)

wherein: the functional groups $R^1$, $R^2$ are, independently, hydrogen, $CH_2OR'$ where R' is a hydrocarbyl group or $-CH_2COOR''$ where R'' is hydrogen or a hydrocarbyl group; —Q is —$CH_2CH_2OH$ or

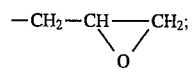

$R^3$ is a hydrocarbyl group;

(B) phosphoric or hypophosphoric acids and/or their anhydrides, esters, amides, imides, esteramides, and combinations thereof;

(C) metals selected from Groups I, II, and III of the Periodic Table: sodium, magnesium, calcium, aluminum, zinc: or metalloids, such as boron and silicon; and/or the oxides, hydroxides, acids and carbonate salts of these elements;

(D) mono- or di- functional monomers or prepolymers with functionalities, based on hydroxyl, carboxyl, ether, amine, and/or amide groups.

The hydrocarbyl groups R', R" and $R^3$ are preferably of a carbon number and structure such that an alcohol derivative of such group would have a boiling point of 130° C. or less.

In general the preparation of foams of the present invention comprises two processes:

(i) synthesis and formulation of the foam precursors: these are liquids or low-melting solids, which remain stable when stored at ambient temperatures, but can react rapidly when properly mixed and/or heated; and (ii) foam-in-place procedures: the mixing and/or heating of foam precursors in the proper combinations and proportions, whereupon they react rapidly to polymerize with the concurrent evolution of gaseous by-products which serve to expand the nascent polymer network, thereby generating (flexible or rigid) foams.

DETAILED DESCRIPTION OF THE PREFERRED EMBODIMENTS

Nonflammable foams are produced as the reaction product of at least two precursors which are chemical compositions having a plurality of functional groups pendant to an otherwise thermoxidatively stable molecular structure. The functional groups of the foam precursors are selected to be rapidly reactive with one another when brought together at ambient or elevated temperatures and to liberate at the reaction temperature a vaporous by-product as the precursors condense with each other to form a crosslinked polymer network, which is expanded during its formation by the vaporous by-product. A large variety of chemical compounds may be used as precursors for the foams of the present invention. Some of these materials are commercially available chemicals. Others are synthesized via reactions and procedures as explained and are novel compositions. For the purpose of organization the foam precursors are classified herein into the following five categories, denoted respectively by the letters (A) through (E).

(A) Polyfunctional Nitrogen-Containing Compounds

Selective use of nitrogen in organic compounds can impart considerable nonflammability to the resulting materials. However, certain nitrogen bonds have poor thermal stability. Consequently, in the foam system of the present invention, when a component contains both nitrogen and carbon atoms in bonding relationship to each other it is preferred that nitrogen is incorporated in the form of heterocyclic structures, such as triazines, cyanurates, isocyanurates, as well as other nitrogen-containing moieties which react to form thermally stable structures.

The preferred nitrogen-containing heterocyclic reagents for producing foams of the present invention are chosen from compounds of the formula:

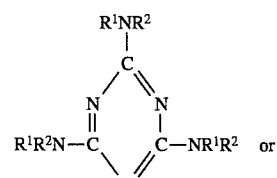  (i)

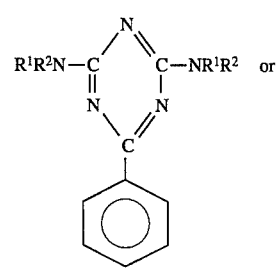  (ii)

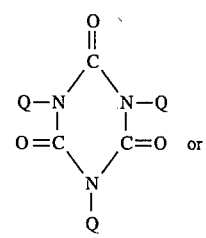  (iii)

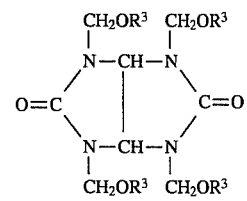  (iv)

wherein: the functional groups $R^1$, $R^2$ in formula (i) may be —H (melamine); $CH_2OR'$ (substituted melamines) where R' is —$CH_3$ (hexakis methylene methoxymelamine), —$C_2H_5$, —$C_3H_8$, —$C_4H_9$, or —$CH_2COOR"$ where R" is —H or —$CH_3$; in formula (ii) the functional groups $R^1$, $R^2$ may be —H (benzoguanamine) or —$CH_2OR'$ (substituted benzoguanamines) where R' represents the same functional groups as used in the substituted melamines of formula (i); in formula (iii) the functional groups —Q are —$CH_2CH_2OH$ (trishydroxyethyl isocyanurate) or

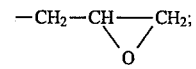

in formula (iv) $R^3$ an alkyl group of one to four carbon atoms.

Many of the above reagents, based on melamine, benzoguanamine, and glycoluril structures are commercially available from the American Cyanamid company under the trade name of Cymel® resins. Isocyanurate-based reagents are available from the Mobay Corporation. Three of the preferred reagents of the present invention will henceforth be referred to in this application by their acronyms: hexakis methylene methoxymelamine will be called HMMM; tris hydroxyethyl isocyanurate, THEIC; tetra methylene methoxybenzoguanamine, TMMBGA.

B. Phosphorus-containing Reagents

Compounds in which phosphorus is in its high oxidation states (+4 or +5) may be used. Specific examples are as follows: (a) phosphorus pentoxide [$P_2O_5$]; (b) phosphoric acid [$H_3PO_4$], either in anhydrous form or as a concentrated (85% by weight) aqueous solution; (c) products of the reactions of (a) or (b) with formic acid [HCOOH], oxalic acid [$HO_2CCO_2H$], as well as aryl- or arylene-containing dicarboxylic acids, such as terpehthalic acid [$HO_2C$—$C_6H_4$—$CO_2H$]; (d) products of the reactions of (a), (b), or (c) with mono- or poly-functional alcohols, such as methanol [$CH_3OH$], ethanol [$C_2H_5OH$], ethylene glycol [$HOCH_2CH_2OH$], pentaerythritol [$C(CH_2OH)_4$], trimethylolethane [$CH_3C(CH_2OH)_3$], trimethylolpropane [$C_2H_5C(CH_2OH)_3$], tris hydroxyethyl isocyanurate (THEIC), and the like; (e) products of the reactions of (a), (b), or (c) with amine-containing moieties, such as ethanolamine [$H_2NC_2H_5OH$], diethanolamine [$HN(C_2H_5OH)_2$], ethylenediamine [$H_2NCH_2CH_2NH_2$] and other polyalkyleneamines, urea [$H_2NCONH_2$], various phenylenediamines [$C_6H_4(NH_2)_2$], and the like.

C. Metals, Metal Hydrates and Salts

Certain (relatively) light metals (such as aluminum, magnesium, calcium, etc.) or metalloids (such as boron, silicon) may be incorporated into the foam system components by reaction with other ingredients. These elements may be introduced in the pure state (in powder form) or as oxides or hydrated oxides (such as $Al(OH)_3$, $SiO_2(H_2O)_x$, etc. ) carbonates (e.g. $CaCO_3$) or other metallic salts.

D. Cross-Link-Density-Controlling Reagents

Certain mono-or di-functional reagents are used for the purpose of controlling the cross-link density of the foamed polymer networks of the present invention. This is achieved by either modifying the functionality of the reagents from category (A), (B), or (C) in the preparation of the foam precursors and/or by introducing linear chain segments of varying length into the foamed polymer network during the foam-in-place procedures. The reagents, classified in Category (D) are selected from organic compositions, based on a variety of functional groups, such as carboxyl, hydroxyl, ether, amine, amide, etc. Examples of such reagents include (but are not limited to) the following compounds: mono- and di-hydroxyarenes, such as phenol, catechol, and resorcinol [see Reaction 1(a) in subsequent section of this Application, entitled "Exemplar Chemical Reactions"]; bisphenol A; oxalamide and its alkyl or phenyl esters [see Reaction 1(b); urea [Reaction 1(c)]; hydrazine, piperazine, phenylene diamine, and their condensation products with difunctional reagents, such as dicarboxylic acids (and their esters), dimethyl hydantoin, dimethyl urea, etc. [see Reactions 2(a) through 2(e)]; difunctional triazones or urons may also be used as a crosslinking agents.

E. Fluorine-containing Reagents

Fluorine is a very effective substitute for hydrogen in the generation of nonflammable and thermally stable chemical structures. It forms covalent bonds with carbon which will not easily oxidize or thermally degrade. Furthermore, the use of fluorinated reagents enhances the flexibility, resiliency and surface softness of the resulting foams. The following are exemplar fluorine-containing reagents which may be used in the present invention.

1. Perfluorated Monomers

The use of fluorinated and perfluorinated monomers depends primarily on their functionality: monofunctional reagents, such as perfluorooctanoic acid and hexafluoro propanol are used primarily as capping agents, to control the reactivity of polyfunctional moieties in the precursors used to generate the foamed polymer networks; difunctional reagents, such as hexafluoroglutaric anhydride, hexafluoropropyleneoxide, hexafluorobisphenol A (4,4'hexafluoropropylidene diphenol), and tetrafluorohydroquinone are used in the synthesis of chain segments. Nonreactive molecules, such as fluorinated and perfluorinated oils can be used as nonflammable plasticizers. To the extent that some of these compounds may contain residual hydrogens, a compound should be chosen so that fluorine and hydrogen atoms are not attached to adjacent carbon atoms; this is in order to avoid the formation of hydrogen fluoride upon heating.

2. Polymeric Perfluoroethers

Polymeric perfluoroethers have repeat units of the type $-\!\!\{CF_2O\}\!\!-$(perfluoromethylene), $-\!\!\{CF_2\!-\!CF_2\!-\!O\}\!\!-$(perfluoroethylene), $-\!\!\{CF_2\!-\!CF(CF_3)O\}\!\!-$(perfluoropropylene), and the like; the chain molecules range in molecular weights from about 1500 to about 7500 and terminate in functional groups such as —OH, —COOH, —COOR (where R=—$CH_3$, —$C_2H_5$, etc.) which are reacted in the process of foam precursor preparation and/or foaming in place. The perfluoroether chains are deliberately chosen for these foam ingredients to the exclusion of the more readily available (and less expensive) perfluorohydrocarbon polymers because the latter generate upon pyrolysis the gas perfluoroisobutylene, which is extremely toxic. The oxygen link in the polyether chain avoids the 4 carbon sequences that would be necessary for the formation of perfluoroisobutylene. In addition, the introduction of oxygen in the structure increases the flexibility of the chain segments. Polymeric perfluoroethers are commercially available from the Du Pont Co. under the name of Krytox®. and from Ausimont Co. under the name of Fomblin®.

Foam System Requirements and Properties

1. Nonflammability

The in situ generation of polymer networks with controlled contents of non-carbon elements (such as F, N, O, P, B, Na, Ca, Mg, Al etc.) enables the production of foam systems with inherent nonflammability that is unequalled by any of the prior art foams. The effectiveness of these heteroatoms in imparting nonflammability depends on the nature of the element and its chemical bonding; oxidizable elements must be in high oxidation states; nitrogen must form high-energy bonds; oxygen is effective only in the form of carboxyl or carbonyl groups. In general, these heteroatoms must constitute at least 17% of the total system for the foams to have LOI values in excess of 40%.

2. Thermal Stability

To insure against degradation and decomposition under the heat produced in fires, the polymer foams must remain stable to temperatures of at least 250° C. (482° F.). In addition, when they do thermally decompose (at higher temperatures) they should not emit toxic or flammable gases. This requirement is met by incorporating the alternative elements into the polymer chains in the form of thermally stable chemical bonds, and by further removal of carbon- and hydrogen-containing moieties from the foam system components via the gaseous by-products formed during the foaming process. Further, wherein a crosslinking structure is produced by the reactive condensation of a functional substituent pendant to a nitrogen atom (such as the methoxymethyl groups of HMMM or TMMBGA) it is preferred to use a coreagent which reacts therewith to produce a structure containing a tertiary nitrogen or an azine. This renders the nitrogen atom more resistant to thermoxidative degradation.

3. Precursor Synthesis and Foam-in-Place Reactions

For rapid and successful foam-in-place performance the foam precursors must possess the following properties:

(i) at ambient temperatures the precursors must be liquids or low-melting-temperature solids and should have acceptable shelf lives (preferably 12 months or greater);

(ii) the precursors must possess reactive functional groups;

(iii) upon mixing and/or heating to temperatures below 150° C., the precursors must polymerize rapidly and preferably exothermally.

(IV) the formation of polymer networks should preferably generate gaseous effluents, which act as foaming agents;

(V) the gaseous effluents emitted during the polymerization/foaming process must have acceptable levels of flammability and toxicity.

These requirements are met in the present invention by the preparation of foam system components that possess reactive functional groups, such as selected oxo acids, carboxylic acids and/or their esters, alcoholic or alkoxy groups and the like, as well as by the use of certain ingredients in their hydrated forms. Upon mixing in the proper proportions and/or heating, the foam system components undergo condensation and/or decomposition reactions, thereby generating polymeric chains and releasing in gaseous form water, carbon dioxide, nitrogen, alcohols, ketones, and/or other small molecules, which serve as foaming agents. Additional, external foaming agents, which decompose thermally at the foaming temperatures to generate large amounts of gaseous products, may also be added to the various foam systems in order to enhance their expansion and thus generate foams with lower density. These external foaming agents, such as oxy bis(benzene sulfonyl hydrazide) [OBSH] and azodicarbonamide [AZ], are generally known in the field and used routinely in prior art foam systems. Certain preferred ingredients of the present invention (such as HMMM and ethanolamines) react with azo foaming agents, causing evolution of nitrogen gas at temperatures considerably lower than the thermal decomposition points of the azo compounds.

4. Rigid v. Flexible Foam Structures

The simplest foam systems with inherent nonflammability and thermal stability consist primarily of heterocyclic, nitrogen-containing structures. Such structures can be readily synthesized and foamed in place to generate low-density, rigid foams that have LOI values over 50 and are stable to temperatures up to 400° C. (752° F.). To generate flexible foams the polymer networks must contain between their crosslink centers linear chain segments, which usually lower the thermal stability of the system. Flexibility with small decreases in thermal stability is achieved in the present invention by the following structures: (i) perfluoroether chain segments between heterocyclic crosslink centers; (ii) polyphosphoric or polyoxyphosphoric chain segments; and (iii) semiladder chains, formed by a series of heterocyclic moieties.

Exemplar Chemical Reactions

The following sections give illustrative, but not limiting, examples of reactions that occur in the synthesis of foam precursors and the foam-in-place processes of the present invention. The exemplar reactions are followed by process Examples, which give the ingredients and describe the methods for preparing several nonflammable and thermally stable foam systems of the present invention.

1. Reduction/Control of HMMM Functionality

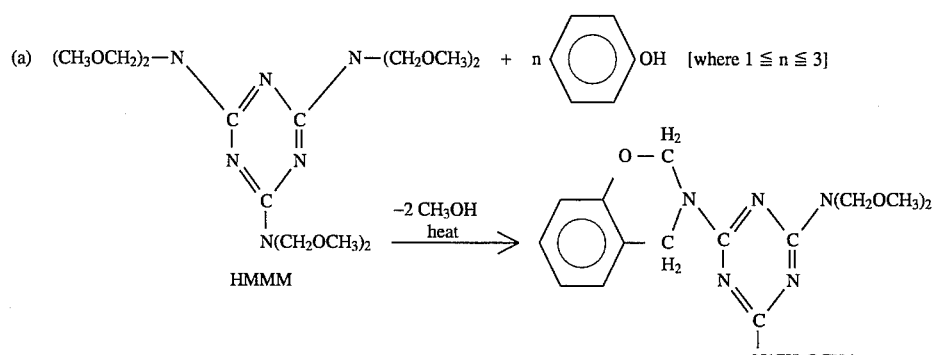

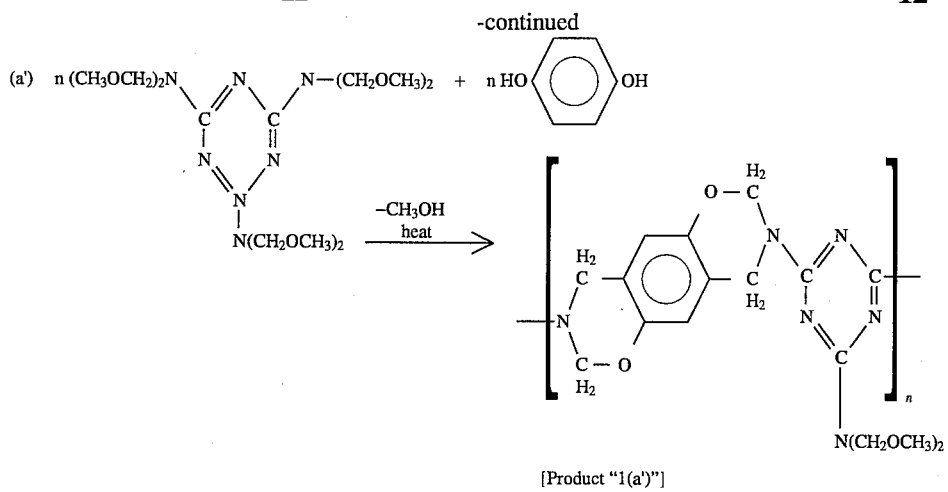

[Product "1(a')"]

Reactions 1(a) and 1(a') are examples of "orthocondensation," the reaction of phenolic hydrogens ortho to the hydroxyl group with the adjacent methyl of HMMM to form a heterocyclic structure. Orthocondensation of HMMM with phenol reduces the HMMM functionality by 2. [Product 1(a)]. Reaction of HMMM with resorcinol (which is bifunctional) generates two orthocondensations, linking a series of HMMM molecules into a prepolymer (Product "1(a')"). Alternative reactions to reduce HMMM functionality utilize the addition of an alkyl ester of phenyl oxalamide. For example:

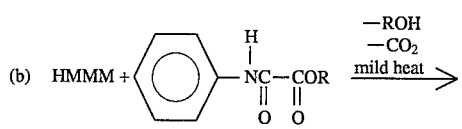

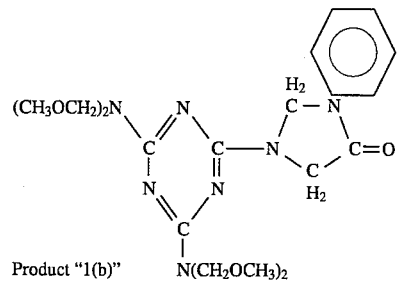

Product "1(b)"

The functionality of HMMM can be also reduced by condensation with monofunctional reagents, such as carboxylic acids (for example $CH_3[CFCF_3—CF_2—O]_pCOOH$) to form transesterification products with methoxy groups pendent to HMMM. Foam-in-place procedures utilize reactions of Products 1(a), 1(a'), 1(b), or their mixtures with di- or polyfunctional species, capable of reacting with the remaining HMMM ether groups, e.g.:

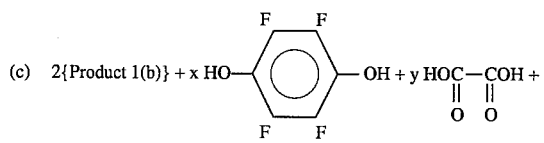

(where $x + y + z = 4$)

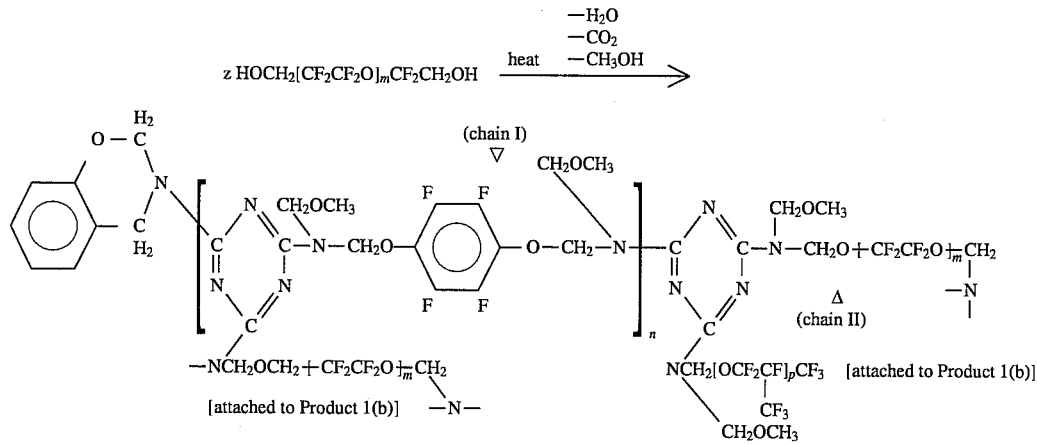

The exemplar polymer networks shown above consist of triazine centers, connected by chains, generated by the condensation of tetrafluorohydroquinone and oxalic acid, (chain I) as well as by polyperfluoroetherdiol chains (chain II). The exemplar phenol in the orthocondensation reaction may be equivalently replaced by partially substituted phenols which still retain a hydrogen ortho to the —OH; the exemplar tetrafuorohydroquinone used to generate Chain I may be equivalently replaced by other aromatic diols, such as hydroquinone, resorcinol, 4,4'sulfonodiol, bisphenol A (and/or its fluorinated analogues) etc.; the exemplar oxalic acid used to generate Chain I may be equivalently replaced by its methyl or ethyl esters or metal salts.

2. Synthesis of Cyclolinear Prepolymers Rich in High-quality Nitrogen

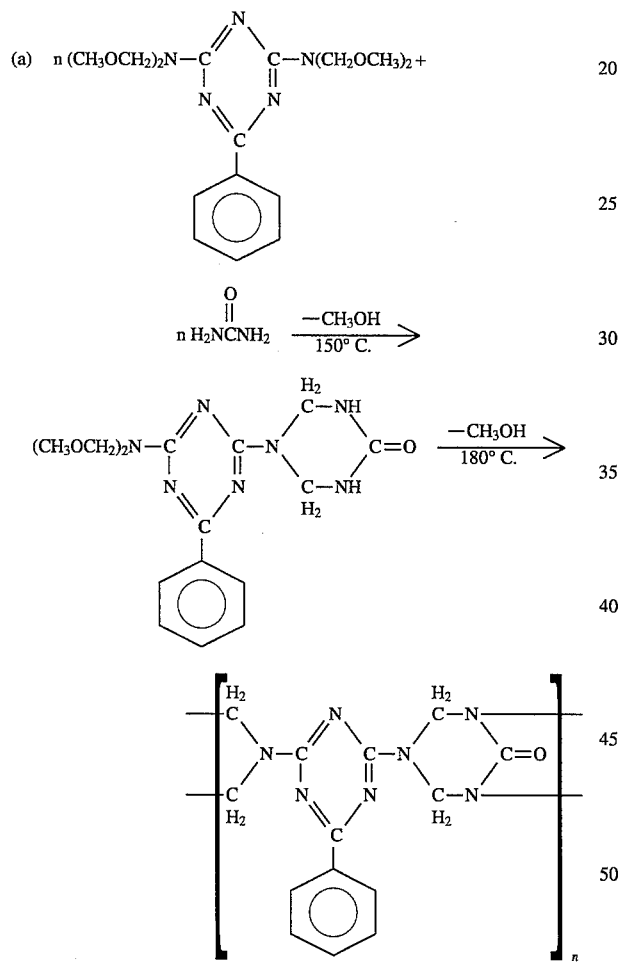

The degree of polymerization (n) depends on the amount of stoichiometric imbalance. In most prepolymers used as foam system components the value of n ranges from about 8 to about 40. This is a (semi)ladder chain with considerable thermal stability.

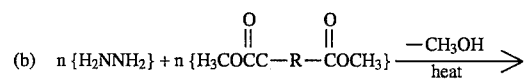

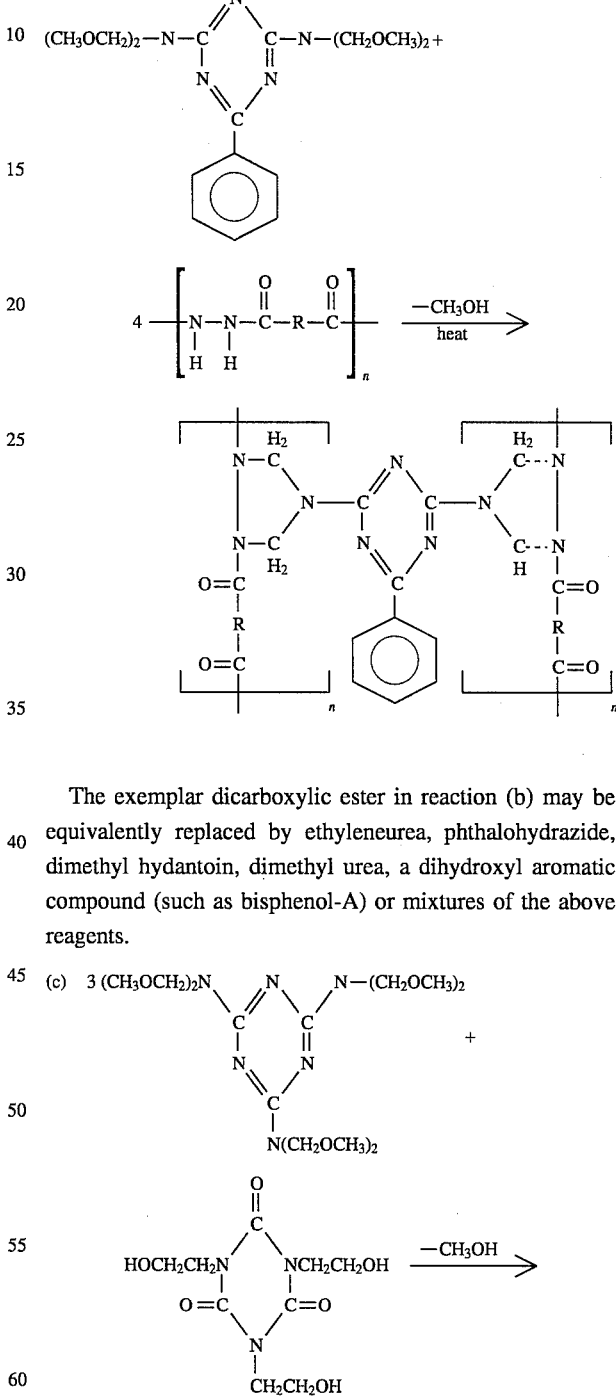

The exemplar dicarboxylic ester in reaction (b) may be equivalently replaced by ethyleneurea, phthalohydrazide, dimethyl hydantoin, dimethyl urea, a dihydroxyl aromatic compound (such as bisphenol-A) or mixtures of the above reagents.

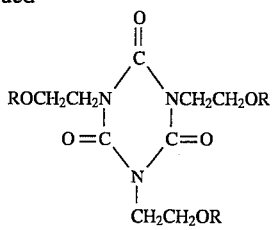

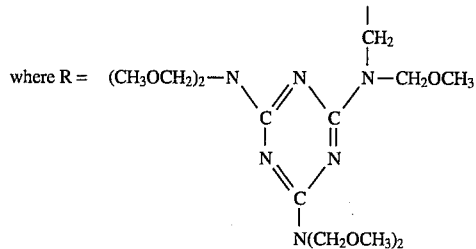

where R = 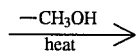

At 75% completion the reaction system contains primarily the above (single) transetherification product (a transparent, low-melting solid) with less than 10% dimers and trimers.

(d) 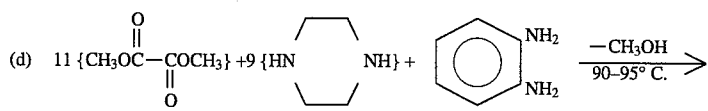

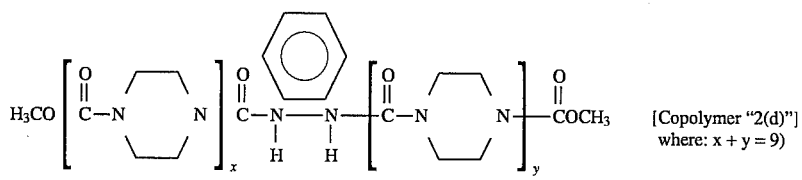

[Copolymer "2(d)"] where: x + y = 9)

mer 2(d) may be replaced by a homopolymer, generated by the condensation of (excess) diethyl carbonate with 1,4 phenylene diamine; this is subsequently reacted with HMMM via the terminal carboxylic groups.

(e) 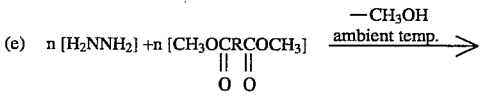

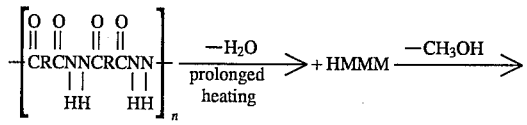

1 mole HMMM
+
3 moles Copolymer 2 (d)

$\xrightarrow{\text{—CH}_3\text{OH}}_{\text{heat}}$

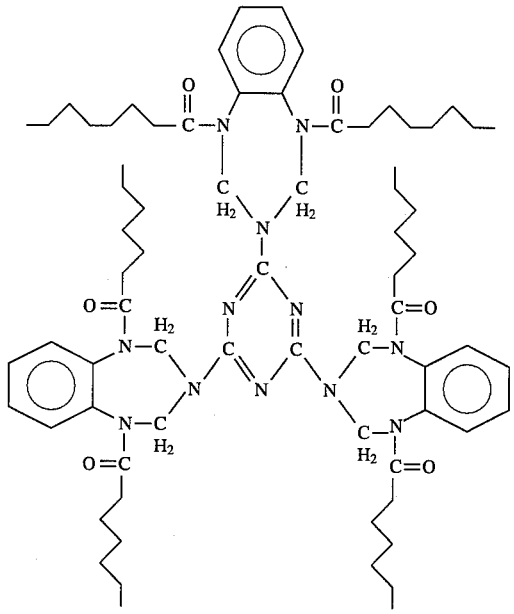

The exemplar carbonate ester used to generate Copolymer 2(d) may be equivalently replaced by dicarboxylic acids, their esters, or amides (e.g., oxalic acid, dimethyl oxalate, oxalamide); or by urea (in which case the gaseous effluent is ammonia). Phenylene diamine may be equivalently replaced by ethylene diamine or 1,2 cyclohexane diamine. Copoly-

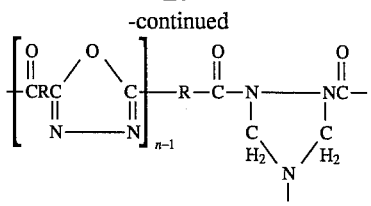

(attached to the remainder of the HMMM molecule).
The degree of conversion depends on heating time.

3. Incorporation of Phosphorus in Foam System Components

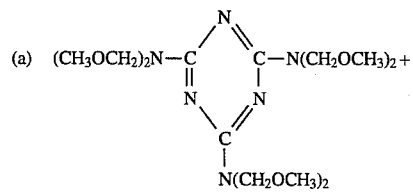

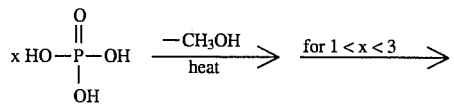

where $1 < x < 6$

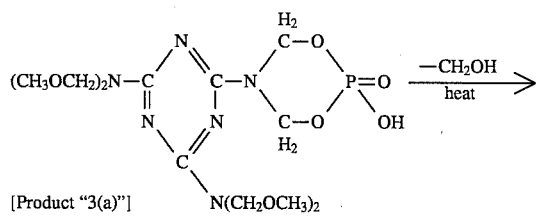

[Product "3(a)"]

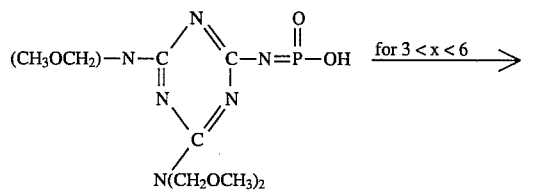

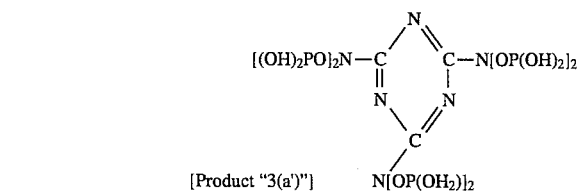

[Product "3(a')"]

At intermediate values of x this reaction gives a mixture of products 3(a) and 3(a'). These products retain the high acidity of phosphoric acid: upon contact with powdered metals (e.g., Al), metal carbonates, and the like [e.g., $CaCO_3$, $(NH_4)_2CO_3$] they react rapidly and exothermally at ambient temperatures with the generation of gaseous products. These reactions are very helpful in the foam-in-place processes: their exotherm provides heat, necessary to drive other concurrent polymerization reactions; the gaseous by-products are effective foaming agents; and the solid products provide phosphorus covalently bonded to the polymer chain. Analogous reactions (but slower and less exothermic) occur when $H_3PO_4$ is partially or completely replaced by its methyl (or ethyl) esters.

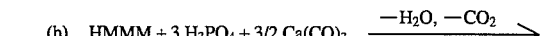

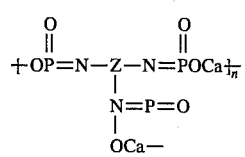

(where —Z— represents the triazine ring)

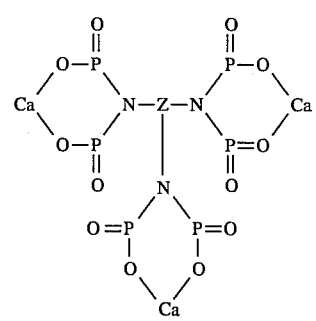

(where —Z— represents the triazine ring)

$H_3PO_4$ values between 3 and 6 give mixtures of products 3(b) and 3(b'). Substitution of calcium with other metals of the same or different valences [e.g., Na, Ag (monovalent), Cu, Mg (divalent), Al (trivalent)] gives similar products and may serve to control the functionality (and amount of crosslinking) of products 3(b) and 3(b'). These metals may be equivalently substituted for each other. The products of Reactions 3(b) and 3(b') and of corresponding reactions of HMMM and $H_3PO_4$ with other metal compounds are characterized by the absence of both carbon and hydrogen and show outstanding nonflammablity and thermal stability. Consequently they can be used as additives to impart nonflammability or fire-retardant properties to otherwise flammable polymer systems.

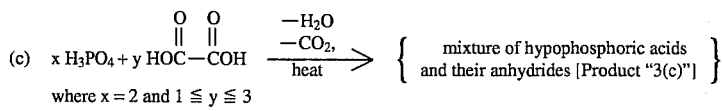

where $x = 2$ and $1 \leq y \leq 3$

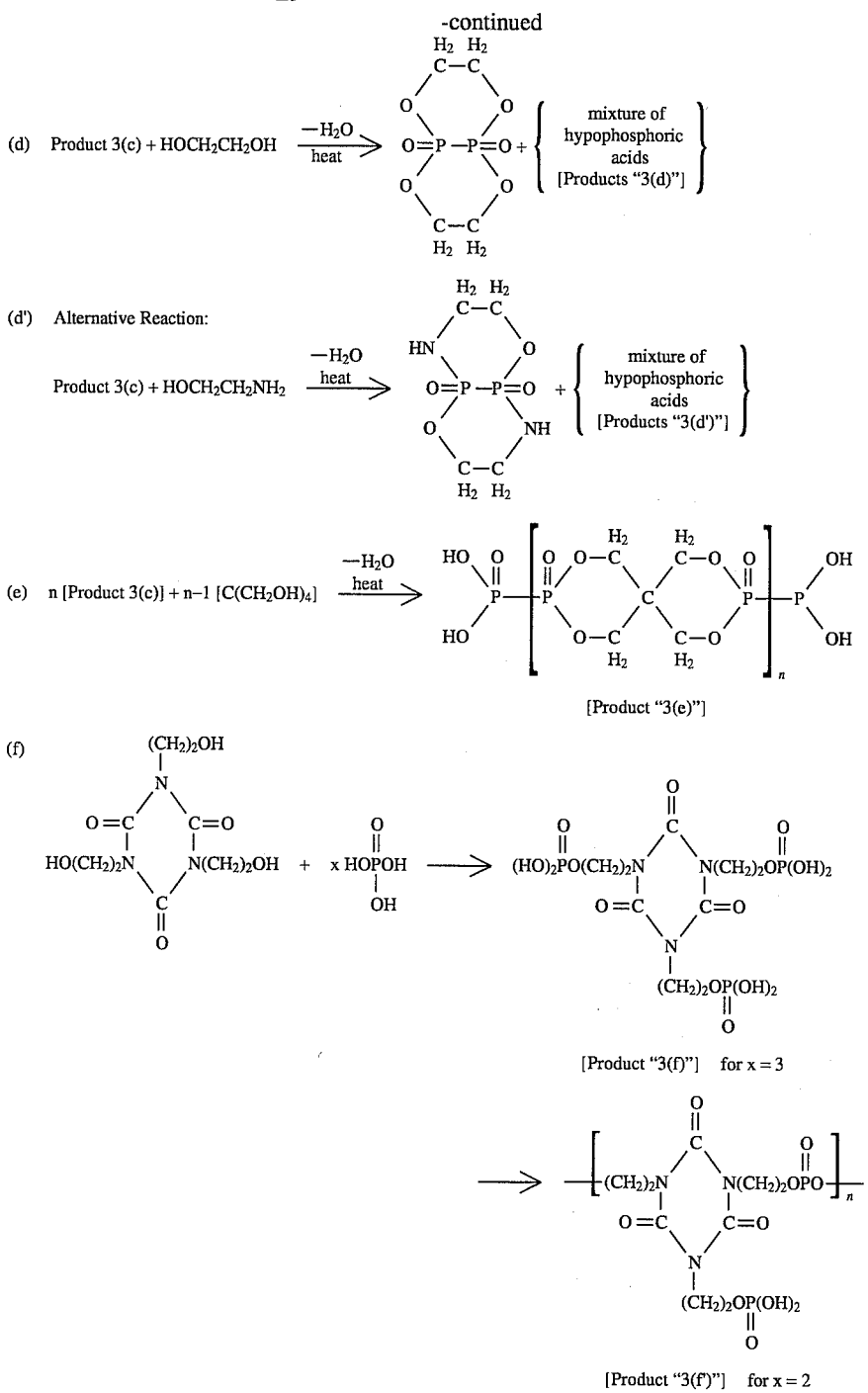

In Reaction 3(f) values of x between 2 and 3 give mixtures of low-molecular weight linear polymers [Product 3(f')] and fully phosphoxylated ethyl isocyanurates [Product 3(f)]. Values of x less than 2 give crosslinked polymer networks. Corresponding reactions occur when phosphoric acid is (fully or partially) replaced by its methyl (or ethyl) esters.

The products of Reactions 3(a) through 3(f) and analogous reactions are low-melting solids or liquids with very high boiling points and outstanding nonflammability and thermal stability. Because of these properties, in addition to their use as foam precursors, these materials may also be formulated into hydraulic fluids, plasticizers for polymers, heat transfer media, and lubricants with nonflammabilities and thermal stabilities superior to the corresponding products known to the prior art.

(g) 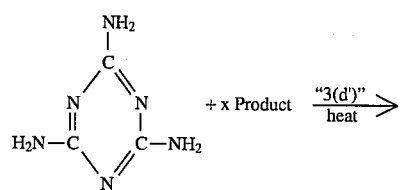

{ mixture of adducts and linear prepolymers in the form of liquids and low-melting solids }

Reaction 3(g) makes it possible to transform melamine, which is a high-melting solid, largely insoluble, and difficult to react, into a tractable product, which contains the thermally stable triazine ring, as well as covalently bonded phosphorus. This compound is highly reactive, due to the presence of hydroxyl groups and amidic hydrogens. The use of melamine instead of HMMM to obtain these products has the advantage of being a simple addition process, which avoids the generation of methanol and formaldehyde, characteristic of reaction 3(a). The exemplar melamine used in reaction 3(g) may be equivalently replaced by other amides, such as terephthalamide, oxalamide, adipamide, ethylene urea, hydantoins, etc.

In addition to their use as foam precursors, the products of Reaction 3(g) and equivalent reactions may also serve as the basis for new fusion coatings with enhanced nonflammability and thermal stability. These fusion coatings would be formulated in conjunction with epoxide resins, based on isocyanurate or hydantoin, such as Araldite® PT810 and Aracost® XUAY238, products of Ciba-Geigy Corp. Fusion coatings are formulated as fine powders, consisting of one or more fusible, reactive components, and are applied onto surfaces (usually) by electrostatic spraying or dipping. Subsequent heating induces fusion and chemical reactions, resulting in a continuous surface coating, which is (usually) a crosslinked polymer network. The use of the products of Reaction 3(g) with epoxide resins as replacements for the epoxide curing agents known to the prior art will enhance significantly the nonflammability and thermal stability of the resulting fusion coatings.

{products with empirical formula: $P_4N_{10}$}
[Product "3(h)"]

The exemplar phosphoric acid may be (partially or completely) replaced by its methyl (or ethyl) esters. The reaction products combine easily with oxygen-containing organic compounds, such as esters, ethers, carboxylic acids, acid anhydrides, etc.

4. Incorporation of Metals in Foam System Components

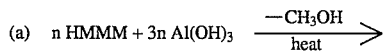

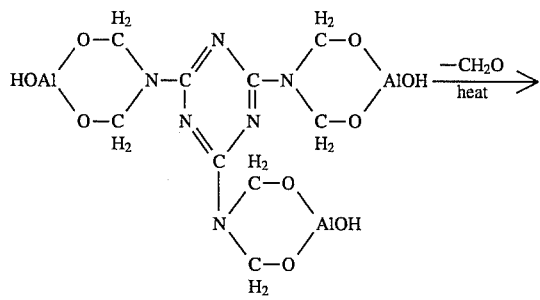

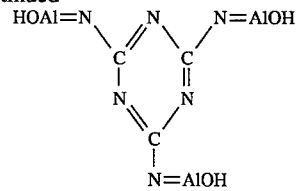

The exemplar alumina trihydrate can be equivalently replaced by other, analogous compounds, such as antimony oxide, ferric hydroxide, hydrated silica, etc.

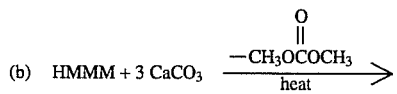

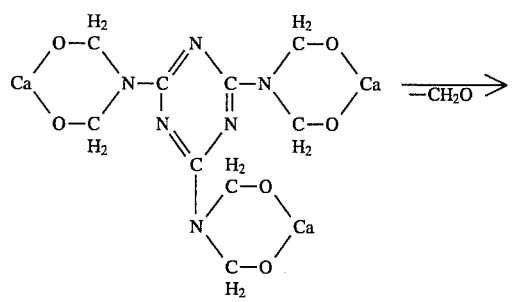

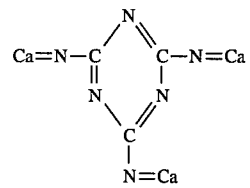

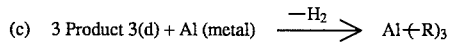

where: $-R$ = (Product 3(d) less its acid proton).

Analogous reactions occur with other metals, such as zinc, with liberation of hydrogen.

The nature of the reactions by which the foams of this invention are produced has mostly been illustrated in the exemplar chemical reactions by reactions between precursors in the form of discrete chemical compounds (monomers). It should be understood that two or more discrete chemical compound precursors may be reacted to an oligomeric composition, i.e., a prepolymer composition, which is itself a precursor for production of the foams of the invention since such prepolymer composition can be subsequently reacted with another precursor, either another monomer or another prepolymer precursor, to form the final foam product. Accordingly, as used herein the term precursor means to include the discrete chemical compounds which are the monomers of the foam and the various non-foamed oligomeric prepolymer compositions which may be prepared by reaction of two or more of such monomers.

The nature of the precursors chosen, their combination as mixtures one with another, their order of addition to each other and their amounts with respect to other foam components may vary widely to provide one, two and three component foam systems, foam-in-place systems that generate rigid or flexible foams which may range widely in density and other foam properties. Two or more of the precursors of a foam system may be partially or wholly reacted with each other to yield a prepolymer, used as a component in the production of a final foam product by subsequent reactions with one or more component(s).

EXAMPLES

The following examples illustrate the methods, whereby the chemical reactions of the present invention are used to produce foam precursors and nonflammable foams. Comparison of the ingredient quantities used in some Examples with the corresponding Exemplar Chemical Reactions indicates that certain reagents/precursors are not used in stoichiometric proportions. This is done on purpose, in order to (i) leave unreacted precursors in the final foam to act as plasticizers, and (ii) leave unreacted precursors in the final foam, so that upon exposure to fire the foam will intumesce and generate water and/or carbon dioxide.

Example 1

[Two Component Foam System]

Ingredients:
For Component A:
 (a) 230 g. (2 moles) phosphoric acid (85% aqueous solution)
 (b) 126 g. (1 mole) oxalic acid dihydrate
 (c) 124 g. (2 moles) ethylene glycol
For Component B:
 (d) 157 g. (0.6 moles) THEIC
 (e) 390 g. (1 mole) HMMM
 (f) foaming agent (optional): OBSH (oxy bis(benzene-sulfonyl-hydrazide)) or (azodicarboamide) AZ Component A: In a stirred reaction vessel, fitted with a condenser and receiver, mix ingredients (a) and (b) and heat at 110°–120° C. with slow stirring for sufficient time to remove by evaporation 10–11% of the initial mass. [The product of this reaction will be referred to as "Product 3(c)" and will be used in other Examples.] Cool to about 50° C. add (c) and reheat to 120°–140° C., until about 30% of the mass has evaporated and the product becomes brown in color.

Component B: Mix (d), (e), and (f) (if necessary) at ambient temperature: they form a stable blend.

Foam-in-Place Procedure

Mix 6 g. of Component A with 4 g. of component B and heat at 140° C. for 2 minutes. Postcure for about 10 minutes at 120°–140° C.

Foam Properties

Color: brown
Density: 40–80 kg/m$^3$; the lower densities are obtained by increasing the amount of Component A by up to 30% and adding foaming agent.
Flexibility: Varies with postcure time; compressive stress required for 50% deflection: 30–50 kPa.
Flammability: LOI is 65–70%; upon direct contact with flame the foams intumesces and chars with emission of small quantities of grey smoke (water vapor and other gaseous effluents).

Example 2

[Two-component Foam System]

Ingredients
For Component A:
 (a) Product 3(c) (see Example 1)
For Component B:
 (b) 28.8 g. (0.2 moles) triethylene tetramine
 (c) 108 g. (0.28 moles) HMMM
 (d) foaming agent (optional): OBSH or AZ Component B Preparation
Mix ingredients at ambient temperature.

Foam-in-Place Procedure
Mix Component A and B in weight ratio of A/B of 4/1. Heat for about 2 minutes at 150° C. and postcure for 5–6 min. at 110°–120° C.

Foam Properties
Color: brown.
Density: 40–70 kg/m$^3$; lower densities achieved with use of foaming agent.
Flexibility: fairly flexible: compressive stress required for 50% deflection: 24 k Pa.
Flammability: LOI is 65–70%; upon direct contact with flame the foams intumesce and char with emission of small quantities of grey smoke (water vapor and other gaseous effluents).

Example 2A

Same as Example 2, except that in Component B the amount of HMMM is doubled and calcium carbonate (42 g.) is added; the mixture is heated at 120° C. Component A remains unchanged. Foam-in-Place procedure also remains the same as in Example 2. The resulting foam is similar in physical properties to Example 2 but shows greater nonflammability: LOI >70%. If the calcium carbonate is not sufficiently dispersed in Component B prior to foaming some unreacted (white) particles of the mineral remain in the foam.

Example 3

[Two-component Foam System]

Ingredients
For Component A:
 (a) 115 g. (1 mole) phosphoric acid (8.5% solution)
 (b) 126 g. (1 mole) oxalic acid (hydrated)
For Component B:
 (c) 24 g. (0.4 mole) ethanolamine
 (d) 52 g. (0.133 mole) HMMM Component Preparation
Component A: mix ingredients (a) and (b) and heat at 120° C. with slow stirring for 3–5 minutes about 10% of the reaction mixture is removed); stop the reaction by cooling before the mixture starts to color. The product is a white, low-melting solid. Component B is a simple mixture of (c) and (d).

Foam-in-Place Procedure
Preheat Components A and B separately to about 70° C. and mix in proportions of 10 parts A to 8.4 parts B. The system foams immediately; no postcuring is necessary.

Foam Properties
Color: orange.
Density: 40–60 kg/m$^3$.
Flexibility: fairly flexible: compressive stress required for 50% deflection: 30 k Pa.
Flammability: LOI=about 70%.

Example 4

[Two-component Foam System]

Ingredients
For Component A:

(a) 390 g. (1 mole) HMMM (b) 180 g. (3 mole) urea (c) 174 g. Epoxide resin: DEN-431 (a product of Dow Chemical Co.)

(d) 17.4 g. hydrazine

For Component B:

(e) 10.0 g. Product 3(c) (see Example 1)

(f) 10.0 g. Component B of Example 2.

Component Preparation

Component A: heat ingredients (a) and (b) with vigorous stirring to about 90° C. for 10–15 minutes until the urea is completely dissolved and about 8% of the initial mass is removed by evaporation. The product is a light-yellow viscous liquid or low-melting solid. Lower the temperature to 70° C. and add ingredients (c) and (d). Component B is a simple mixture of components (e) and (f).

Foam-in-Place Procedure

Preheat Components A and B separately to about 70° C. and mix in approximately equal amounts [the amount of B may be decreased by as much as 30% without significant effects on foam properties]. The system foams upon mixing. Postcuring is not necessary. However, the foam may be postcured at about 100° C. for up to 20 minutes to increase its rigidity if this is desired.

Foam Properties

Color: yellow.

Density: 60–100 kg/m$^3$.

Flexibility: variable, depending on postcure.

Flammability: LOI: 65 to >70%.

Thermal Stability: TGA: 4.2% weight loss at 200° C.

Example 4A

Same as Example 4 except that in the ingredients, Product 3(c) is replaced by equivalent amounts of phosphorus pentoxide. The resulting foam is rigid but has the same nonflammability and thermal stability as the foam in Example 4.

Example 4B

Same as Example 4 except that in the ingredients, Product 3(c) is replaced by terephthalic acid and phosphoric acid in a ½ molar ratio (166/230 g). The resulting foam is rigid.

Example 5

[Three-component Foam System]

Ingredients:

For Component A:

(a) 261 g. (1 mole) THEIC (b) 420 g. (3 moles) trimethyl phosphate

For Component B:

(c) 1170 g. (3 moles) HMMM (d) 228 g. (1 mole) biphenol-A

For component C:

(e) 166 g. (1 mole) terephthalic acid (f) 230 g. (2 moles) phosphoric acid (85% aqueous solution)

(g) 40 g. epoxide resin: DEN-431 (Dow Chemical Co.) or PT810 (Ciba-Geigy).

(h) foaming agent: OBSH or AZ

Component Preparation

Component A: mix ingredients and heat slowly. A clear solution is obtained at about 70° C. Continue to heat at 95°–100° C. with slow stirring until 15–16% of the initial mass is removed by evaporation. The final product is a transparent yellow liquid, which remains stable in storage.

Component B: mix ingredients and heat. A clear solution forms at about 130° C. and gaseous effluents start to form at about 160° C. Continue heating until the color starts to change from yellow to orange; at this point the system has lost about 5.4% of its original mass. The final product is a viscous, transparent yellow liquid, which remains stable in storage.

Component C: mix ingredients and warm gently to 80° C. until gaseous effluents start to form. Stop the reaction at this point by cooling to ambient temperature. The product is a yellow, turgid viscous fluid, which may separate into two phases during storage; however it is easily homogenized by mixing.

Foam-in-Place Procedure

Mix the three components in proportions of A/B/C=5.8/13.6/4.4 by weight and add 2–3% by weight foaming agent (the foaming agent may be added to one or more of the components before mixing since it is stable in storage). Heat for 2 minutes at about 140° C.

Foam Properties

Color: yellow.

Density: 50–120 kg/m$^3$; the lower densities are obtained by the higher amounts of foaming agent.

Flexibility: 30–40 kPa for 50% deflection.

Flammability: LOI is 70%; upon direct contact with flame the foams form a hard char with evolution of small amounts of white smoke add characteristic phenolic odor.

Thermal Stability: TGA: 5% weight loss at 200° C.

Example 5A

Same as Example 5 except that the foaming agent is replaced by 0.8 g. aluminum trihydrate. The product is a white foam with higher density, rigidity, and strength, and enhanced nonflammability.

Example 5B

Same as Example 5 except that the foaming agent is replaced by 0.6 g antimony trioxide. The resulting foam properties are similar to those of Example 5A.

Example 5C

Same as Example 5 except that it utilizes a different Component C, as follows:

(a) 390 g. (1 mole) HMMM (b) 87 g. (0.33 mole) THEIC (c) 10.3 g. (0.1 mole) urea (d) 2–4 g. Component A.

Component C is prepared by heating ingredients (a) and (b) at 120° C. with slow stirring until about 5.6 of the initial mass is lost by evaporation. The product is then cooled to about 50° C. and ingredients (c) and (d) are added. Foam-in-place utilizes azodicarbonamide as a blowing agent (0.3–0.4 g per 10 g. foam mixture) and takes place at 140° C.

Example 6

[One-component System]

Ingredients (a) 58.5 g. (0.15 moles) HMMM (b) 18.8 g. (0.2 moles) phenol (c) 18.2 g. tetrafluorohydroquinone (d) 1.9 g. oxalic acid Component Preparation Mix ingredients (a) and (b) and heat at 125°–130° C. for sufficient time to remove by evaporation about 13 g. of the reaction mixture. Add (c) and continue to heat with removal of about 6.5 g. Cool to 50° C., add ingredient (d), and stir until system becomes clear.

Foam-in-Place Procedure

The system foams spontaneously and rapidly upon heating above 70° C.

Foam Properties

The resulting foams are rigid and brownish in color with densities ranging from 40–100 kg/m$^3$, depending on the amount of ingredient (d), which acts as a foaming agent. These foams have outstanding thermal stability, retaining >95% of their weight at 300° C. (under dynamic TGA tests).

Example 7

[One-component System]

Ingredients (a) 58.8 g. (0.15 mole) HMMM (b) 8.6 g. (0.1 mole) ethyleneurea (c) 6.0 g. (0.1 mole) urea (d) 2–4 g. oxalic acid.

Component Preparation

Mix ingredients (a) and (b) and heat at 120° C. until about 5.7 g. of the reaction mixture is removed by evaporation. Add (c) and resume heating to remove about 4 g. of the reaction mixture. Cool to 50° C. and add ingredient (d). Stir until system becomes clear.

Foam-in-Place Procedure

The system foams rapidly upon heating above 70° C.

Foam Properties

The resulting foams are yellow in color, rigid, and brittle. Their densities range from 30–120 kg/m$^3$, depending on the amount of ingredient (d), which acts as a foaming agent. These foams have outstanding thermal stability, retaining >95% of their weight at 300° C.

Example 8

[One Component System]

Ingredients (a) 60 g. HMMM (b) 13.05 g. THEIC (c) 26.9 g. calcium formate (d) 6.5 g. dimethyl oxalate (e) 0.1 g. trimethyl phosphate (f) foaming agent (optional): OBSH or AZ.

Component Preparation

Mix ingredients (a) and (b), heat at 120°–150° C. to remove about 3 g. of the reaction mixture, and cool to 50° C. Add (c), heat to 110° C. for about 20 minutes, cool to 50° C., add (d), and stir until clear. Cool to ambient temperature and add (e) and (f).

Foam-in-Place Procedure

Heat system to 155° C.; a stable foam is generated within 1 minute.

Foam Properties

The resulting foams are yellow in color and fairly flexible, with densities ranging from 50 to 150 kg/m$^3$.

Example 8A

Same as Example 8 except ingredient (c) is replaced by 28 g. of maleic hydrazide and the amount of ingredient (e) is increased to 49 g. (in this example trimethyl phosphate is used as a reagent/plasticizer, whereas in Example 8 it served primarily as a reaction promoter). Foaming occurs at 100° C.

Example 9

[Two-component Foam System]

Ingredients

For Component A:

(a) 99.0 g. dimethyl carbonate (b) 77.4 g. piperazine (c) 10.8 g. phenylenediamine For Component B;

(d) 39.0 g. HMMM (e) foaming agent (optional) OBSH or AZ.

Component Preparation

Component A: Mix ingredient (a) and 60% of (b), heat for about 1 hour at about 90° C. Cool to ambient temperature and add the remainder of (b) and ingredient (c). Heat at about 190° C. for about 90 min. Cool to about 60° C. and disperse into the system 60% of the foaming agent.

Component B: Disperse the remaining foaming agent into ingredient (d).

Foam-in-Place Procedure

Mix the two components in proportions (by weight) of 4 parts A to 1 part B and heat to 100°–120° C. The system foams within 1 minute.

Example 10

[One-component Foam System]

Ingredients (a) 50 g. hydrazine (64% aqueous solution)

(b) 118 g. dimethyl oxalate (c) phosphoric acid (85% aqueous solution)

Component Preparation

In a cooled reaction flask place component (a) and add (b) slowly with instant stirring. After the initial exotherm dissipates, heat at about 110°–120° C. until c. 60 g. of the initial mixture have evaporated. In a separate, cooled reaction flask slowly add 4 g. of ingredient (c) to the remainder of (a). After the initial exotherm dissipates heat at about 110°–120° C. until about 30 g are lost by evaporation. Cool and mix the two preparations.

Foam-in-Place Procedure

The system foams spontaneously when heated rapidly to about 160° C.

Example 11

[One or Two-component Foam System]

Ingredients

For Component A;

(a) 7.8 g. Cymel 301® (a melamine molding compound from American Cyanamide Co.)

(b) 2.0 g. Fomblin Zdol (a polymeric perfluroether from Ausimont Co.)

(c) 1.0–3.0 g. diethyl oxalate [or 0.8–2.4 g. dimethyl oxalate]

For Component B:

(d) 2.0 g. Fomblin Zdol

Component Preparation

Place ingredients (a) and (b) in a beaker or reaction flask; the two liquids are immiscible. Heat with slow stirring at 120° C. for 10–15 minutes; until the mixture becomes a transparent liquid. Add ingredient (c), which serves as a foaming agent.

Foam-in-Place Procedure

Mix the two components and heat for 1–2 minutes at 100°–120° C. Carbon dioxide and methanol, which are evolved in the reactions, act as the internal foaming agents. Alternatively a one-component system may be formed by mixing the two components at ambient temperature. A single-phase system forms, which is stable upon storage and can be made to foam in place by heating to 100°–120° C. for 1–2 minutes.

Foam Properties

The resulting foams are white, with densities ranging from 140 to 220 kg/m$^3$, very soft, and highly resilient (Compressive force for 50-% deflection: 1.3 kPa). They are nonflammable (LOI >70%) and upon direct contact with flame they char at constant volume with emission of small quantities of white smoke.

Example 12

[One-component System]

Ingredients (a) 4.0 g HMMM (b) 1.4 g phenol (c) 2.8 g. acrylamide (d) 3.0 g. triethylene glycol (e) foaming agent: OBSH or AZ Precursor Preparation Mix ingredients (a) and (b) and heat to about 130° for 45 minutes; cool to about 100° C. and add (c), (d) and 2–3 weight % (e).

Foam-in-Place Procedure

Heat system to 150° C.; it reacts and expands within 2 minutes to form a flexible foam with excellent nonflammability and good impact absorption properties.

Example 13

[One-component System]

Ingredients (a) 2.7 g. Aracast® XU-AY238 epoxide resin (product of Ciba-Geigy Corp.)

(b) 1.3 g. melamine (c) 5.7 g. ethylene carbonate (d) 6.4 g. phosphoric acid (85% aqueous solution)

(e) 7.8 g HMMM (f) foaming agent: OBSH or AZ

Precursor Preparation

Mix ingredients (a), (b), (c) and (e) and heat to 120° C. The suspended melamine reacts with ethylene carbonate and the system becomes homogeneous; cool to 100° C. and add components (d) and (f).

Foam-in-Place Procedure

Heat system to 150° C.; it reacts and expands within 3 minutes to form a flexible, highly nonflammable foam.

Example 14

[Two-component System]

Ingredients (a) 3.2 g of Product 3(d) or 3(d') (hypophosphoric acids)

(b) 2.4 g. of alumina trihydrate (c) foaming agent: OBSH or AZ

Foam-in-Place Procedure

The ingredients are also the foam precursors; the foaming agent may be added to component (a) in quantities of 2–3% by weight. Upon mixing and heating to 60° C. the ingredients react within 2–3 minutes to form a rigid foam which is totally inorganic in composition, and shows outstanding nonflammability and stability to 1,000° C.

OVERALL CHARACTERISTICS OF THE PROCESSES/PRODUCTS OF THE INVENTION

Examination of the ingredients and reactions used to prepare the chemical compositions of the present invention and a review of the physicochemical properties of the resulting foams indicate that the preferred embodiments of the present invention meet and exceed its stated objectives. The raw materials for the foam precursors are readily available; furthermore, most of these materials are inexpensive commodity chemicals. While certain key reactions in the preparation of foam precursors are novel in concept, as well as in their use for polymer synthesis, all of these reactions are straightforward and can be carried out commercially with simple chemical process equipment, well known and extensively used in prior art. As a consequence the costs of producing foam precursors for most embodiments of the present invention are quite moderate and are estimated to be comparable to the costs of the components currently used in commercial polyurethane foam systems. The foam precursors of the present invention are liquids or low-melting solids at ambient temperatures and have reasonable shelf lives; consequently they can be stored and dispensed for use with equipment and machinery currently developed for prior art foam systems.

The foam precursors of the present invention, because of their reactivity, can be made to generate foamed polymer networks within a few minutes of their being mixed together and/or heated; consequently they are suitable for foam-in-place applications, comparable to those for which polyurethane foams are used in the prior art. However, because of their novel chemical composition and structure, the foams of the present invention show a unique combination of physicochemical properties, that are not present in any current foam systems known in the prior art. Specifically:

(i) unmatched nonflammability: LOI values of 50 to over 70% for the present invention foams, compared to 38–43% for polyimide foams (the most nonflammable prior art foams).

(ii) resistance to flame propagation: upon exposure to open flame the present invention foams intumesce while generating substantial quantities of water vapor, and eventually form a char, which retains considerable residual strength; this behavior generates a barrier to the advancement of the flame front. In contrast, polyimide foams shrink upon exposure to flame and do not generate fire-extinguishing gases.

(iii) excellent thermal stability: TGA data show that some of the present-invention foams are comparable in thermal stability to polyimide foams; selected formulations can be made to resist total decomposition at temperatures up to 800° C.

The chemical compositions and products of the present invention, while sharing the very important common characteristics of inherent nonflammability and thermal stability, comprise a wide variety of structures and physiochemical properties. The foam system components may be formulated in the form of one-, two-, or three-component systems; foam-in-place reactions can be effected through a range of temperatures, from ambient to about 150° C.; depending on component choice and stoichiometric proportions the polymer networks formed by these reactions can be made to vary considerably in flexibility, resiliency, and strength; and the resulting products include both closed-cell and open-cell foams that cover a wide range of flexibility and resiliency.

Although the invention has been described and illustrated by reference to its preferred embodiments, those skilled in the art may from this description appreciate changes or modifications that may be made therein which do not depart from the scope and spirit of the invention as described above and claimed hereafter.

We claim:

1. A non-flammable polymer foam, comprising:
   a reaction product of at least two precursors, each precursor comprising a chemical composition having a plurality of functional groups pendent to a thermooxidatively stable chemical structure, one precursor being a nitrogen-containing precursor which is melamine or a derivative of melamine, the functional groups of one precursor being rapidly and condensively reactive with the functional groups of the other precursor to form additional thermooxidatively stable chemical structures so as to generate a polymer network while liberating reaction by-products which are vaporous at the reaction temperature, and consequently serve to expand the nascent polymer network.

2. A non-flammable polymer foam, comprising:
   a reaction product of at least two precursors, each precursor comprising a chemical composition having a plurality of functional groups pendent to a thermooxidatively stable chemical structure, one precursor being a nitrogen-containing precursor which is a triazine or benzoguanamine ring pendent to which are amine or substituted amino groups, the functional groups of one precursor being rapidly and condensively reactive with the functional groups of the other precursor to form additional thermooxidatively stable chemical structures so as to generate a polymer network while liberating reaction by-products which are vaporous at the reaction temperature, and consequently serve to expand the nascent polymer network.

3. The foam of claim 2, wherein the substituents of the substituted amino group are the functional groups and are of the formula —CH₂OR', —CH₂COOR" or —CH₂CH₂OR' wherein R' and R" are hydrocarbyl groups which in alcohol form having a boiling point not exceeding about 130° C. and R" may be hydrogen.

4. The foam of claim 3, wherein R' is methyl, ethyl, propyl, or butyl and R" is hydrogen or methyl.

5. A non-flammable polymer foam, comprising:
   a reaction product of at least two precursors, each precursor comprising a chemical composition having a plurality of functional groups pendent to a thermooxidatively stable chemical structure; one precursor being a nitrogen-containing precursor which is melamine, a hexakis alkylene alkyloxymelamine, a hexakis alkylenecarboxylic acid- or alkylester-melamine, benzoguanamine, a tetrakis alkylene alkyloxybenzoguanamine, a tetrakis alkylenecarboxylic acid- or alkylester-benzoguanamine, a trishydroxyalkyl isocyanurate, or a trisalkyleneoxide isocyanurate; the functional groups of one precursor being rapidly and condensively reactive with the functional groups of the other precursor to form additional thermooxidatively stable chemical structures so as to generate a polymer network while liberating reaction by-products which are vaporous at the reaction temperature, and consequently serve to expand the nascent polymer network.

6. A non-flammable polymer foam, comprising:
   a reaction product of at least two precursors, each precursor comprising a chemical composition having a plurality of functional groups pendent to a thermooxidatively stable chemical structure; one precursor being a nitrogen-containing precursor which is a cyanurate, isocyanurate or glycoluril ring and pendent to the nitrogen atoms of the ring are functional groups of the formula

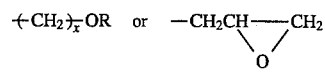

wherein R is hydrogen, or a $C_{1-4}$ alkyl group and x is 1 to 30; the functional groups of one precursor being rapidly and condensively reactive with the functional groups of the other precursor to form additional thermooxidatively stable chemical structures so as to generate a polymer network while liberating reaction by-products which are vaporous at the reaction temperature, and consequently serve to expand the nascent polymer network.

7. The foam of claim 6, wherein at least one precursor comprises a polyfunctional carboxylic acid, amine, alkyl ester or oxalamide; a urea or urea derivative; a dialkyl carbonate; or a mono- or di-ethanolamine, or hydroxy- or methylhydroxyaceto-N-amide.

8. A composition, comprising:
   a non-flammable vapor-expanded polymeric network produced by reactive condensation of:
   (A) a polyfunctional, nitrogen-containing, heterocyclic compound of the formula:

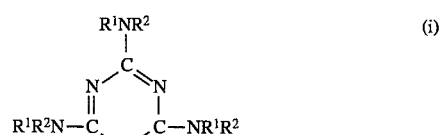  (i)

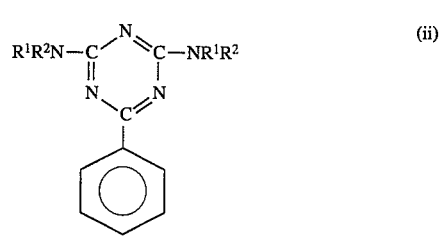  (ii)

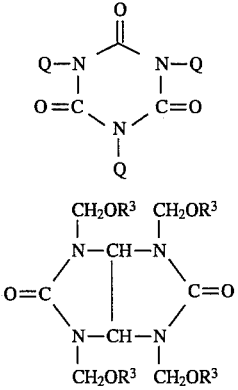

(iii)

(iv)

wherein $R^1$, $R^2$, are $CH_2OR'$ where $R'$ is —$CH_3$, —$C_2H_5$, —$C_3H_7$, —$C_4H_9$, or $CH_2COOR''$ where $R''$ is —H or —$CH_3$;

each Q is —$CH_2CH_2OH$ or,

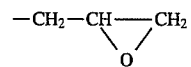

and $R^3$ is a lower alkyl group with at least one other reagent selected from the group consisting of:
(B) phosphoric or hypophosphoric acids, their anhydride, esters, amides, imides, esteramindes, and combinations thereof;
(C) metals or metalloids selected from Groups I, II and III of the Periodic Table and their oxides, hydroxides, and carbonate salts; and
(D) mono- or di- functional monomers or polyfunctional prepolymers comprising thermooxidatively stable chemical structures having pendent hydroxyl, carboxyl, ether, amine, or amide groups.

* * * * *